Nov. 3, 1925.

W. I. MILESTONE

CHEESE CUTTER

Filed Aug. 19, 1924

1,560,090

INVENTOR.
Walter I. Milestone.
BY M. C. Frank
ATTORNEY

Patented Nov. 3, 1925.

1,560,090

UNITED STATES PATENT OFFICE.

WALTER I. MILESTONE, OF OAKLAND, CALIFORNIA, ASSIGNOR OF ONE-HALF TO ALFRED W. GREEN, OF OAKLAND, CALIFORNIA.

CHEESE CUTTER.

Application filed August 19, 1924. Serial No. 732,932.

*To all whom it may concern:*

Be it known that I, WALTER I. MILESTONE, a citizen of the United States, residing at Oakland, in the county of Alameda and State of California, have invented certain new and useful Improvements in Cheese Cutters, of which the following is a specification.

My invention relates broadly to improvements in cheese cutters, and more particularly to means for holding the cheese upon the table or board thereof.

Present computing cheese cutters and other cutters without the computing mechanism attached thereto that I am familiar with, have for anchoring or holding the cheese upon the rotary table thereof, spaced and projecting knife-like stationary blades. These blades are secured to the table and form a rigid part of it, and are pointed and positioned radially thereon. In use, the cheese is positioned centrally on the tops of the blades and concentric with the table, and then pressed down over the blades until the cheese rests directly upon the table surface. Here the cheese remains until it is all measured off, cut and sold. These blades have many deficiencies I have found, and among which may be mentioned that the cutter blade on nearing or reaching the holding blades invariably flakes or chips off pieces of cheese which result in waste; sometimes the cutter blade strikes the holding blades resulting in a dulled cutting edge thereat; and the most serious deficiency is that in the average store the cheese remains on the table and holders many days before it is consumed, and because of this length of time, mold sets in the cheese at and about the region of the said holders which gouge the cheese, and which mold tends to permeate throughout the cheese. Another serious deficiency is that the last or final exposed surface of the cut cheese and its adjacent region, is dried out to such an extent that the last pound, more or less, is unsalable and hence is waste and loss of profit like the aforementioned flakes and chips.

To completely overcome the above objections are my major objects. I attain them by providing holding means that does not in any way cut, mar, dent or otherwise mutilate the cheese; also the cheese may be freely removed and turned over as often as desired to cut from either exposed cut surface, thus the last portion will not be dried out because of the said reversals.

With the above and other objects in view, my invention consists in certain novel features of construction, form and arrangement of parts. The accompanying sheet of drawings, forming a part of this specification, illustrates an embodiment of my invention, and what I claim as new, is particularly pointed out in the appended claims following this specification.

Figure 1:
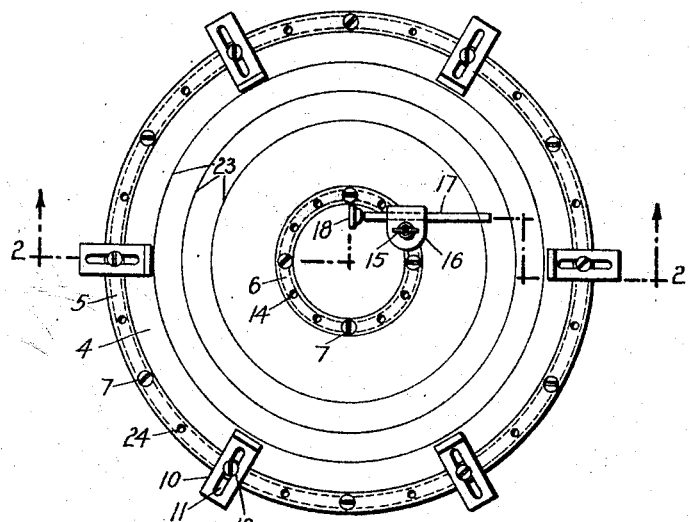
Figure 1 is a plan of a rotary table of a cheese cutter having my invention applied thereto.
Figure 2:
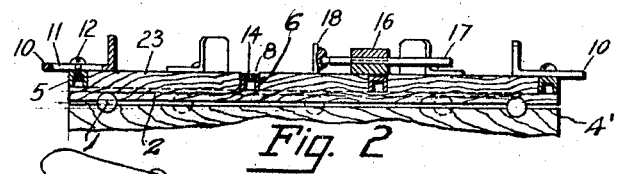
Figure 2 is a vertical section through the upper portion of the table of Fig. 1 along the line 2—2.

I will now describe the invention in detail: The numeral 4 designates a table or board which is mounted to rotate upon the base 4' as by balls 1 seated therein and adapted to roll in a groove 2 in the table. 5 and 6 are preferably channelled metallic rings recessed and secured in the table by any suitable means, such as screws 7. The channels are formed to collect any surface cleanings and the rings can be removed from time to time to remove the cleanings. The inner ring is preferably positioned slightly below the surface as at 8, so that the cutter blade 9 will not contact the rings and be dulled thereby.

10 are preferably spaced angle brackets having elongated slots 11, and 12 is a screw or the like to guide and hold the bracket in the positioning of the latter against the cheese 13. The ring contains a series of tapped holes 24 for the interchangeability of any of the screws therein.

In the central ring 6 is a series of tapped holes 14, to receive the thumb-screw 15 of the split clamp 16. Through the latter a rod 17 is adapted to slide, and be clamped where desired. To one end of the rod I prefer to secure a ball-and-socket head 18, for adjustment purposes to be later described.

Figure 3:
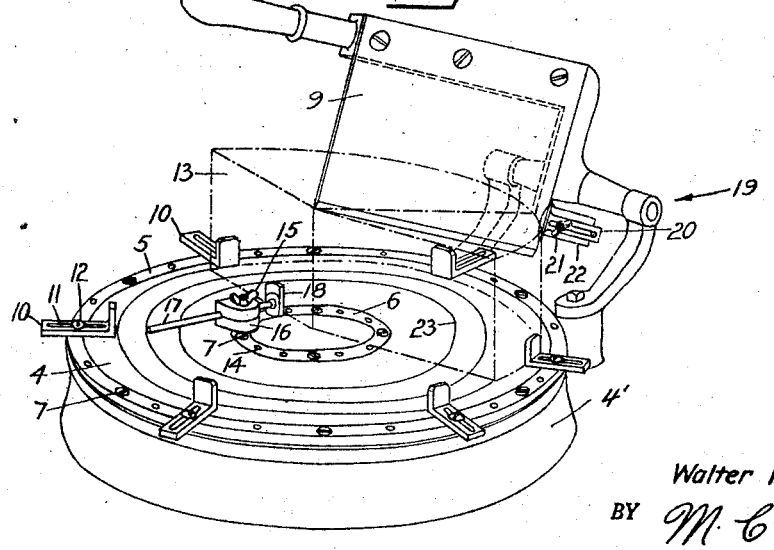
Fig. 3 is a perspective view of a cheese cutter and cheese mounted thereon and held in place by and in accordance with my invention. The cheese is shown in dot-and-dash lines.

In Fig. 3, 19 represents a conventional cheese-cutting mechanism, and to the blade 9 of which, I sometimes may wish to add an auxiliary sliding bracket 20, having a thumb-screw 21 for clamping the said bracket to the blade-extension 22. The function of the auxiliary bracket will be set forth in the operation of the device.

The circles 23 indicate the customary inscribed lines for aiding in the positioning of the cheese on the table.

My improvement operates as follows: The cutting mechanism 19 is thrown back clear of the table 4, and the brackets 10 radially slid to their outer limit and the center-ring clamp 16 removed; then the selected cheese is placed upon the table, and pushed by the fingers to a concentric position thereon, aided by the guide lines or circles 23. When positioned, each bracket 10 is moved toward the cheese until its upstanding leg contacts it, and the bracket is then secured by tightening the screw 12. Thus the cheese is centered and held upon the table without gouging or mutilating the same in the least degree. After the first slice or two is cut from the cheese, the adjustable clamp 16 is attached in one of the series of tapped holes 14 in the ring 6, and by manipulating the said pivotal clamp 16, the face of the head 18 may be made to contact the exposed face of the cheese; thus the cheese is prevented from shifting or slipping toward the center of the table when the blade 9 is going through the cheese to effect a cut. In cutting and nearing a bracket 10, the said bracket may be removed and placed in another tapped hole 24 in its ring 5, or slid to its outer limit.

As stated, in some cases I put on an auxiliary bracket 20 in the blade-extension 22, and set this bracket after the first cut of the knife is made in the cheese; at this time I slide the bracket until its spherical end face contacts the cheese, and then I tighten the thumb-screw 21. The auxiliary bracket prevents backward movement of the cheese.

By placing the cheese as described, the same is never under stress and it may be turned over for reversal as many times a day as desired. Both exposed cut surfaces may then be considered fresh surfaces, and no final dried-out waste end can result.

Having thus illustrated and described my invention what I claim as new and desire to secure by Letters Patent of the United States is the following:

1. In combination with a cheese cutter of a rotary table for the reception of a cheese having a ring at its outer margin recessed substantially flush with the table and said ring supporting sliding brackets for holding the cheese in position on the table by contact therewith.

2. In combination with a cheese cutter, of a rotary table for the reception of a cheese having a ring at its outer margin recessed substantially flush with the table, and said ring supporting sliding brackets for holding the cheese in position on the table by contact therewith, and said table further provided near its center with a concentric similar ring supporting an adjustable clamp having a sliding bar to contact the exposed surface of the cheese when cut to prevent the cheese from shifting.

3. In a cheese cutter of the class described, a cutting blade having an extension and a sliding member thereon and supported thereby, and said member adapted to be set to contact the cheese to limit its backward movement in the cutting thereof.

In testimony whereof I affix my signature.

WALTER I. MILESTONE.